United States Patent [19]
Johansson et al.

[11] Patent Number: 5,903,557
[45] Date of Patent: May 11, 1999

[54] METHOD AND APPARATUS FOR DETERMINING ACTIVATION STATUS OF A RECEIVING STATION OF A RADIO COMMUNICATION SYSTEM

[75] Inventors: Carl Fredrik Johansson; Anders Henriksson, both of Göteborg, Sweden

[73] Assignee: Telefonaktiebolaget L M Ericsson (publ), Stockholm, Sweden

[21] Appl. No.: 08/723,764

[22] Filed: Sep. 30, 1996

[51] Int. Cl.[6] .................................................. H04J 3/24
[52] U.S. Cl. ........................................ 370/349; 370/389
[58] Field of Search .................................. 370/349, 395, 370/389, 396, 397, 241, 244, 247, 248, 251, 352, 353, 356, 360; 371/31, 32, 33, 34

[56] References Cited

U.S. PATENT DOCUMENTS

| | | | |
|---|---|---|---|
| 4,774,707 | 9/1988 | Raychaudhuri | 370/95 |
| 5,079,765 | 1/1992 | Nakamura | 370/401 |
| 5,440,545 | 8/1995 | Buchholz et al. | 370/426 |

FOREIGN PATENT DOCUMENTS

| | | |
|---|---|---|
| 0 347 360 A3 | 12/1989 | European Pat. Off. . |
| 0 507 626 A3 | 10/1992 | European Pat. Off. . |
| 0 511 744 A2 | 11/1992 | European Pat. Off. . |
| 35 36 505 A1 | 10/1985 | Germany . |
| PCT/SE97/01628 | 2/1998 | WIPO . |

OTHER PUBLICATIONS

Mobeen Khan and John Kilpatrick, MOBITEX and Mobile Data Standards, IEEE Communications Magazine, No. 3, Mar. 1995, pp. 96–101.

*Primary Examiner*—Dang Ton
*Attorney, Agent, or Firm*—Jenkens & Gilchrist, P.C.

[57] ABSTRACT

Apparatus and method for determining the activation status of a receiving station of a communication system. A sending station determines the activation status of the receiving station to be active, possibly inactive, or inactive. When the receiving station is only temporarily unable to receive signals transmitted thereto by the sending station, the sending station is less likely to determine the receiving station to be inactive as the receiving station is first determined to be possibly inactive.

24 Claims, 5 Drawing Sheets

METHOD AND APPARATUS FOR DETERMINING ACTIVATION STATUS OF A RECEIVING STATION OF A RADIO COMMUNICATION SYSTEM

The present invention relates generally to the communication of packets of message data between a sending and a receiving station of a radio communication system. More particularly, the present invention relates to a method, and associated apparatus, for determining more accurately the activation status of a receiving station.

When the receiving station is in an active status, the receiving station is able to receive, and to acknowledge reception of, message data transmitted thereto. When the receiving station is in an inactive status, the receiving station is unable to receive message data transmitted thereto. When in the inactive status, the receiving station therefore does not acknowledge reception of the message data.

In operation of an embodiment of the present invention, the receiving station is not immediately, and irrevocably, concluded to be inactive if the receiving station fails to acknowledge reception of the message data. Instead, the receiving station is first determined to be possibly inactive as the failure of the receiving station to acknowledge reception might only be temporary. When additional message data is to be transmitted to the receiving station, an activity-request is first sent by the sending station. If the receiving station acknowledges reception of the activity request, the sending station determines the activity status once again to be active and message data is thereafter transmitted.

Utilization of an embodiment of the present invention is particularly advantageous when the receiving station is a portable unit, such as a portable, hand-held radio modem operable in a Mobitex (tm) system. The hand-held, radio modem might be carried to be positioned temporarily out of reception range of downlink signals transmitted by a base station of the network portion of the Mobitex system. Instead of immediately determining that the hand-held, radio modem is inactive, one or more activity requests are first transmitted by the base station of the network portion to the radio modem. Additional determinations are then made responsive to indications of whether the radio modem acknowledges reception of the activity requests.

BACKGROUND OF THE INVENTION

Information is communicated in a communication system between a sending station and a receiving station by way of a communication channel. The sending station includes at least a transmitter for transmitting an information-containing, communication signal to the receiving station. And, the receiving station includes at least a receiver for receiving the communication signals transmitted thereto.

A radio communication system is a type of communication system. In a radio communication system, the communication channel forming a link between the sending and receiving stations is formed of a portion of the electromagnetic frequency spectrum. Unlike conventional, wireline communication systems, no fixed or hard-wired connection is required to form the link between the sending and receiving stations. Therefore, when the use of a fixed or hard-wired connection between the sending and receiving stations would be inconvenient or impractical, a radio communication system is particularly advantageously utilized.

Communication of the information between the sending and receiving stations may be effectuated by formatting the information into packets of data. Once formatted into packets, the information can be transmitted to the receiving station in discrete bursts, formed of a single packet, or a series of packets, to the receiving station. Packet data communications are sometimes effectuated in a radio communication system.

A Mobitex (tm) communication system is a type of radio communication system in which packet data communications are effectuated. In such a system, a base station forming a portion of a Mobitex network transmits packets of message data on downlink channels to selected, remotely-positioned mobile radio modems. A Mobitex system is a multi-user system in which, typically, large numbers of remotely-positioned, radio modems are capable of receiving packets of message data. Once significant amounts of data are to be communicated to a mobile radio modem, sequences of packets of message data are transmitted to the modem. Each time in which a mobile radio modem receives a packet of message data, the radio modem acknowledges reception of such packet. Such acknowledgment is made by transmitting back to the Mobitex network an acknowledgment signal. Detection at the Mobitex network of the acknowledgment signal indicates to the network not only that the packet has been received but also that the radio modem is in an active state.

Transmission difficulties might prevent the reception at the mobile radio modem of the packets of message data transmitted thereto. The mobile radio modem may, for instance, be carried to a position whereat the radio modem is unable to receive properly the packets of message data transmitted thereto. When, for example, the radio modem is carried into the interior of a building structure, the building structure might significantly attenuate the packets of message data transmitted by the base station of the network portion, thereby to prevent the radio modem from receiving the packets.

When the mobile radio modem fails to receive the packets of message data, the radio modem fails to send an acknowledgment response back to the network portion. In at least one Mobitex system, once a selected number of packets of message data transmitted to a mobile radio modem are not acknowledged to have been received there at, the modem is considered to be inactive and further communications of message data to the radio modem are at least temporarily halted.

However, if the radio modem is only temporarily positioned beyond the coverage area of the Mobitex system, the network might prematurely determine the radio modem to be inactive. If the radio modem is thereafter repositioned at a location in which message data transmitted by the Mobitex network can once again be received by the radio modem, a premature determination that the radio modem is inactive prevents the efficient communication of message data to the radio modem.

A manner by which the activation status of the radio modem can be more accurately determined would therefore be beneficial. A mobile radio modem, or other receiving station, positioned only temporarily beyond the coverage area of a sending station, such as a base station of a Mobitex network portion of a Mobitex system would thereby be less likely to be determined prematurely to be inactive.

It is in light of this background information related to communication systems in which packets of data are transmitted between sending and receiving stations that the significant improvements of the present invention have evolved.

SUMMARY OF THE INVENTION

The present invention advantageously provides a manner by which to determine the activation status of a receiving station which receives packets of message data. When packets of message data are not acknowledged to have been received at a receiving station, the receiving station is first determined to be in an activation state of possibly inactive. When additional packets of message data are to be transmitted to the receiving station, an activity-request is instead first transmitted to the receiving station. If the receiving station acknowledges reception of the activity request, the receiving station is determined to be of an activation status of active. If, conversely, no response acknowledging reception of the activity-request is detected, the receiving station is determined to be inactive.

Because the receiving station is determined to be of an activation status of possibly inactive prior to a determination of the activation status of the receiving station to be inactive, a premature determination of the inactive status of the receiving station is less likely to be made. When, for instance, the receiving station is only temporarily positioned at a location preventing the receiving station from receiving the packets of message data from a sending station, the activation status of the receiving station is not prematurely designated to be inactive, thereby permitting additional communication of message data to the receiving station.

In one aspect of the present invention, a Mobitex (tm) communication system is operable to transmit frames of message data from a network base station to any of a plurality of mobile radio modems. When a radio modem to which a frame of message data is transmitted receives such frame, the radio modem acknowledges reception with an acknowledgment response signal transmitted back to the base station of the Mobitex network. If the radio modem to which the frame of message data is transmitted is unable to receive the transmitted frame, no acknowledgment is returned to acknowledge reception of such frame. When a determination is made at the network of the absence of acknowledgment responses responsive to the transmission of the message frames, an activity-request frame is transmitted by the base station of the Mobitex network to the mobile radio modem. If the radio modem detects the activity-request frame, the radio modem acknowledges such reception with an acknowledgment response signal. Upon reception at the base station of the Mobitex network of the acknowledgment response signal, the activation status of the radio modem is determined to be active. Otherwise, the activation status of the radio modem is determined to be inactive.

When the mobile radio modem is temporarily positioned beyond the coverage range of the Mobitex network, such as when the mobile radio modem is positioned within a building structure which significantly attenuates downlink signals transmitted by the Mobitex network, the radio modem is not immediately determined to be inactive. Instead, the radio modem is considered first to be possibly inactive. And, one or more activity-request frames are transmitted to the radio modem. If the radio modem is repositioned to once again be positioned within the coverage area of the Mobitex network when the activity-request frames are transmitted, the radio modem is able to receive such activity-request frames and acknowledge reception thereof. A premature determination of the radio modem to be of an activation status of inactive is thereby avoided.

In these and other aspects, therefore, apparatus, and an associated method, determines an activation status of a remote communication station. A packet switching network is operable to communicate packets of data to the remote communication station. A transmitter is coupled selectively to receive packets of message data and packets of activity-request data. The transmitter transmits the packets of message and activity-request data when received there at. A response detector detects acknowledgment response signals generated by the remote communication station. Each acknowledgment response signal acknowledges reception at the remote communication station of a packet transmitted thereto by the transmitter. A controller is operable at least responsive to detections made by the response detector. The controller determines the activation status of the remote communication station to be active when the response detector detects an acknowledgment response signal responsive to transmission of a packet of message data by the transmitter. The controller determines the activation status of the remote communication station to be possibly inactive when the response detector detects an absence of an acknowledgment response signal responsive to transmission of a selected number of packets of message data. The controller determines the activation status of the remote communication station to be inactive when the response detector detects an absence of an acknowledgment response signal responsive to transmission by the transmitter of a selected number of packets of activity-request data.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
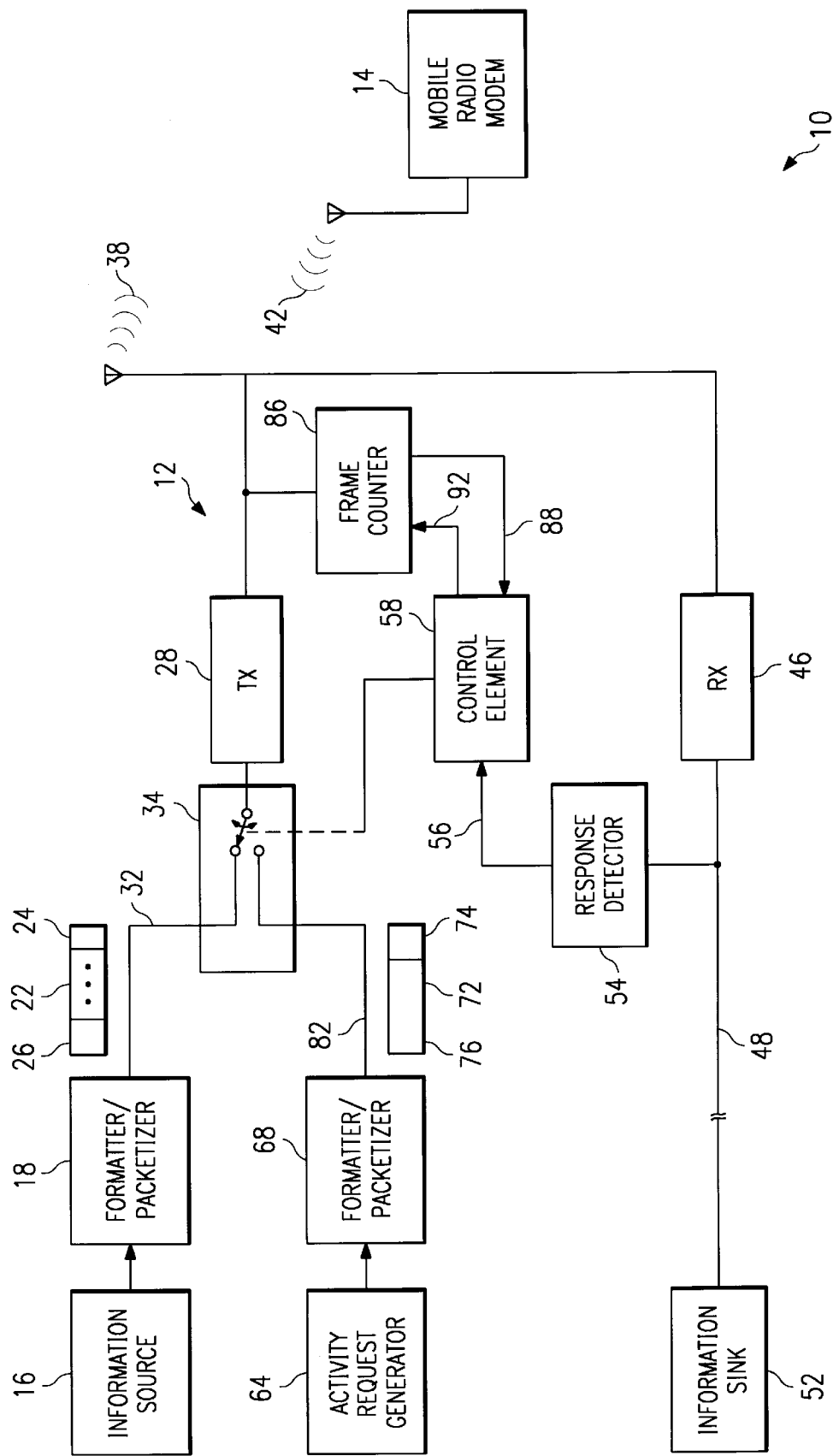
FIG. 1 illustrates a functional block diagram of a radio communication system in which an embodiment of the present invention is operative.

FIG. 1 illustrates a radio communication system, shown generally at 10, in which an embodiment of the present invention is operative. While the communication system 10 shown in FIG. 1 is, in an exemplary embodiment, a Mobitex (tm) system, the communication system 10 is similarly also representative of other types of communication systems.

The communication system 10, forming a Mobitex system, is here shown to include a network station 12 which is operable to communicate with a plurality of mobile radio modems, of which a single mobile radio modem 14 is illustrated in the figure. Information is communicated from the network station 12 to the mobile radio modem 14 on downlinks formed therebetween and to receive signals generated by the mobile radio modem on uplinks formed therebetween. As described previously, a Mobitex system communicates packets of data, formatted into frames of data. During operation of the communication system 10 to communicate information between a network station 12 and the mobile radio modem 14, determinations are made of the activation status of mobile radio modems to which information is to be communicated.

The network station 12 of the network is shown, in the exemplary embodiment, to include an information source 16 at which the information to be communicated to the modem 14 is contained. While the information source 16 is shown functionally in the figure, the data of which the information source is representative can be generated there at or can be supplied thereto, all in conventional fashion.

The information source 16 is coupled to a formatter-packetizer 18 which formats the data applied thereto into a form pursuant to the communication scheme by which the communication system 10 is operable. In the exemplary embodiment in which the communication system 10 forms the Mobitex system, the information is formatted into frames of data by the formatter 18. An exemplary message frame 22 is illustrated in the figure. Each message frame formed by the formatter-packetizer 18 includes a header portion 24 followed by a maximum of thirty-two blocks 26 of data. Each block 26 of data is formed of up to eighteen bytes of data. Therefore, each message frame can be formed of up to 576 bytes of data.

Once formatted and packetized by the packetizer 18, message frames are selectively applied to a transmitter 28 by way of line 32. The selective coupling of the line 32 to the transmitter 28 is indicated in the figure by way of a switch element 34. When the switch element 34 is positioned in a switch position to couple the line 32 to the transmitter 28, the transmitter 28 is operable to modulate the message frame 22 applied thereto upon a selected channel forming a downlink between the network station 12 and the mobile radio modem 14. The signal 38 shown in the figure is representative of the modulated signal generated by the transmitter 28 upon the downlink formed between the network station 12 and radio modem 14.

When the radio modem 14 receives a message frame transmitted thereto, the modem acknowledges reception of the message frame. To acknowledge such reception, the mobile radio modem 14 generates and transmits back to the network station 12 an acknowledgment response upon an uplink channel, here indicated by the signal 42. If, however, a transmission breakdown occurs, the message frame is not received at the modem 14, and no acknowledgment is returned to the network station.

The network station 12 further includes circuitry for at least receiving the acknowledgment response signals generated on the uplinks formed between the base station and radio modem 12 and 14. A receiver 46 is positioned to receive such acknowledgment responses transmitted to the network station 12. The receiver 46 is operable in conventional manner to demodulate the acknowledgment response signals received there at and to generate signals representative thereof on the line 48. Such signals are applied through additional circuitry (not shown, but conventional nature) to an information sink 52.

A response detector 54 is also coupled to the line 48. The response detector 54 is operable to detect times in which an acknowledgment response signal is received by the receiver 46. When the response detector 54 detects reception of an acknowledgment response signal by the receiver 46, the detector 54 generates a signal indicative of such reception on line 56.

The line 56 is coupled to a control element 58. The control element 58 is operable at least responsive to such indications to control the switch position of the switch element 34.

The network station 12 further includes an activity-request generator 64. The activity-request generator is operable to generate an activity-request. The activity-request generated by the generator 64 is applied to a formatter-packetizer 68. The formatter-packetizer 68 is operable in manners analogous to operation of the formatter-packetizer 18, here to format the activity-request into an activity-request frame. Again, in the exemplary embodiment in which the communication system 10 forms a Mobitex system, the frame into which the packetizer 68 formats the activity-request into a frame, such as the frame 72 illustrated in the figure. The frame 72 is formed of a header 74 and a single block 76 forming the activity-request. The activity-request frame 72 generated by the formatter-packetizer 68 is generated on line 82. The line 82 is also selectively coupled to the transmitter 28 by way of the switch element 34.

The network station 12 is further shown to include a frame counter 86. The frame counter is coupled to receive the signals generated by the transmitter 28 and is operable to count numbers of frames transmitted by the transmitter. The frame counter 86 is operable to maintain separate counts of the activity request frames and of the message frames. The frame counts counted by the frame counter 86 are applied to the control element 58 by way of a line 88. Line 92 coupled between the control element and the frame counter 86 permits the control element to reset the count values of the frame counter.

During normal operation of the communication system 10 to communicate information between the network station 12 and the mobile radio modem 14, the control element 58 effectuates positioning of the switch position of the switch element 34 to couple the line 32 to the transmitter 28. Message frames formatted by the formatter-packetizer 18 to be applied to the transmitter 28 to be transmitted therefrom. When the mobile radio modem 14 receives each sequentially-transmitted message frame, the modem 14 acknowledges reception there at with an acknowledgment response signal.

The acknowledgment response signal is transmitted back to the network station 12 and is received at the receiver 46. The response detector 54 detects reception by the receiver 46 of the acknowledgment response signal and provides indications of such detection to the control element 58.

In the event that the mobile radio modem 14 does not receive a message frame transmitted thereto, an acknowledgment response signal is not returned to the network station 12. As the acknowledgment response signal is not generated, the acknowledgment response signal is not received at the receiver 46, and the response detector 54 does not detect reception of such a signal. When a selected number, N, of message frames are transmitted to the mobile radio modem 14 without receiving an acknowledgment response signal acknowledging response thereto, the control element causes the switch position of the switch element 34 to couple the line 82 with the transmitter 28. In one embodiment in which the radio modem 14 is also operative to transmit uplink data or other signals to the network station, detection of such signals at the network station 12 are indications of an active status of the modem, and the control element permits the transmitter to remain coupled to the line 32.

The frame count counted by the frame counter 86 provides the control element 58 with the frame count to permit the control element to determine when to alter the switch position of the switch element 34. When no acknowledgment is made responsive to transmission of the N message frames, the switch 34 is positioned to couple the line 82 to the transmitter 28. Up to M activity-request frames generated by the formatter-packetizer 68 are applied to the transmitter 28. The transmitter 28 transmits the activity-request frames applied thereto to the mobile radio modem 14. If the mobile radio modem 14 receives an activity-request frame transmitted as a downlink thereto, the radio modem 14 acknowledges the reception there at with an acknowledgment response signal. Such signal is transmitted back to the network station 12. When the receiver 46 receives the acknowledgment response signal, the response detector 54 detects such reception and provides an indication of such detected response to the control element 58. Responsive thereto, the control element 58 determines the activation status of the radio modem 14 to be active. Again, in one embodiment, detection of other signals from the radio modem 14 also causes the control element to determine the activation status of the radio modem to be active.

Thereafter, the control element thereafter effectuates the switch position of the switch element 34 to couple again the line 32 to the transmitter 28. Additional message frames are thereafter transmitted, if needed, to the mobile radio modem 14.

If, conversely, the selected number M of activity request frames are transmitted by the transmitter 28 on the downlink to the mobile radio modem 14, the control element 58 instead determines the mobile radio modem 14 to be of an activation status of inactive. Thereafter, additional message frames are not transmitted to the modem 14 for at least a selected period of time. In one embodiment, a determination that the activation status of the modem is inactive is also, or alternatively, made if no acknowledgment response signals are detected within a selected time period.

During the operation of an embodiment of the present invention, the network station 12 does not immediately determine the activation status of the mobile radio modem to be inactive upon failure of the modem 14 to acknowledge response of a selected N number of message frames. Instead, the modem is first determined to be of an activation status of possibly inactive. And, up to a selected number M activity-request frames are transmitted to the mobile radio modem. As the activity-request frame is of a much smaller frame length and the frame length of a typical message frame, the determination of the actual activity status of the mobile radio modem 14 can be determined with minimal utilization of the downlink capacity between the network station 12 and mobile radio modems.

Figure 2:
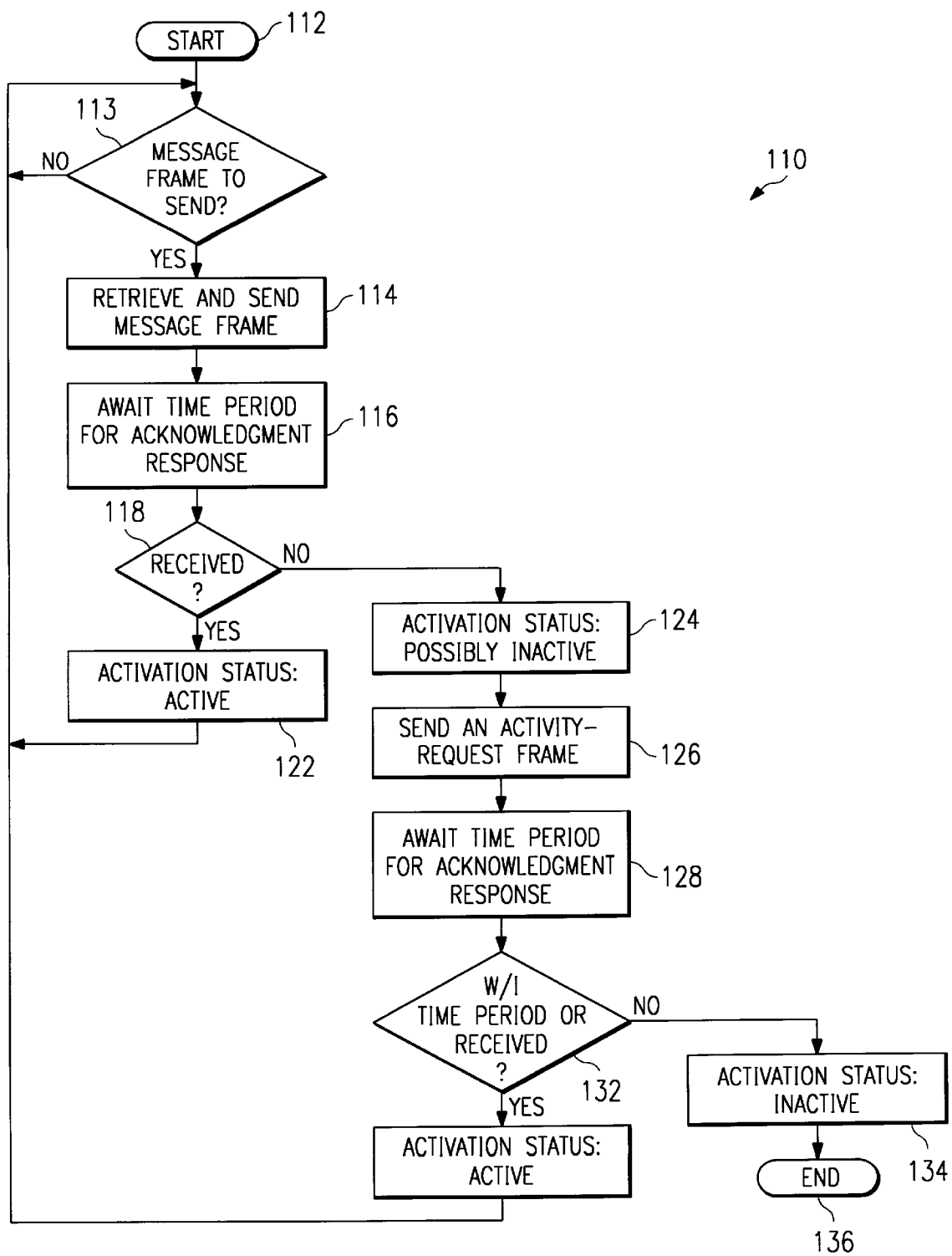
FIG. 2 illustrates a method flow diagram listing the method steps of an embodiment of the present invention.

FIG. 2 illustrates a method, shown generally at 110, of an embodiment of the present invention. The method 110 is operative to determine the activation status of a mobile radio modem, such as the radio modem 14 shown in FIG. 1. The method 110 is, in an exemplary embodiment, implemented at the network portion, such as at the network station 12 (shown in FIG. 1).

After entry, indicated by the start block 112, a determination is made at the decision block 113 as to whether a message frame is to be sent. If not, the no branch loops back to the decision block. If a message frame is to be sent, the yes branch is taken to block 114. A message frame is transmitted by the network station to the radio modem. When the mobile radio modem receives the message frame transmitted thereto, the radio modem acknowledges the reception there at by returning to the network station an acknowledgment response signal. Subsequent to transmission of the message frame, the network station awaits for at least a selected time period, indicated by the block 116, for the acknowledgment response signal to be transmitted back to the network station.

At the decision block 118, a determination is made as to whether or not the acknowledgment response signal has been received at the network station. If so, the yes branch is taken, and the activation status of the radio modem, as indicated by the block 122, is determined to be active. Thereafter, the branch is taken back to the block 113 and additional message frames are sent, if needed, to the radio modem. In one embodiment, a determination is also made as to whether transmission of any other signal generated by the receiving station has been detected. For instance, and with respect to a Mobitex system, if a modem-generated packet of message data is received at the network station, the yes branch is also taken to the block 122. Such determination can also be made, for instance, by way of interrupts or the like.

If, however, an acknowledgment response signal has not been received at the network station, the no branch is taken from the decision block 118 and the activation status of the radio modem is determined to be possibly inactive, as indicated by the block 124. When the activation status of the radio modem is determined to be possibly inactive, at least one activity-request frame is transmitted from the network station to the mobile radio modem, as indicated by the block 126. If the radio modem receives the activity-request frame transmitted thereto, the modem acknowledges reception by returning an acknowledgment response signal to the network station. As indicated by the block 128, the network station awaits at least a selected time period for the acknowledgment response signal to be received.

At the decision block 132, a determination is made as to whether or not an acknowledgment response signal has been received at the network station responsive to transmission of the activity-request frame. If the acknowledgment response signal has been received, the yes branch is taken, and the activation status of the radio modem is determined to be active, as indicated by the block 134. Thereafter, a branch is taken back to the block 114 and additional message frames, if needed, are transmitted to the radio modem. Again, in one embodiment, a determination is also made as to whether transmission of any other signal by the receiving station is detected, similar to that described with respect to the decision block 118.

If, however, an acknowledgment response signal is not detected at the decision block 132, the no branch is taken, and the activation status of the radio modem is determined to be inactive, as indicated by the block 134. Additional message frames are not transmitted to the radio modem, at least for a selected time period, and a branch is taken to the end block 136. In the illustrated embodiment, a determination is also made whether a selected time period during which the acknowledgment response should have been made has timed-out. If so, the no branch is also taken.

Figure 3:
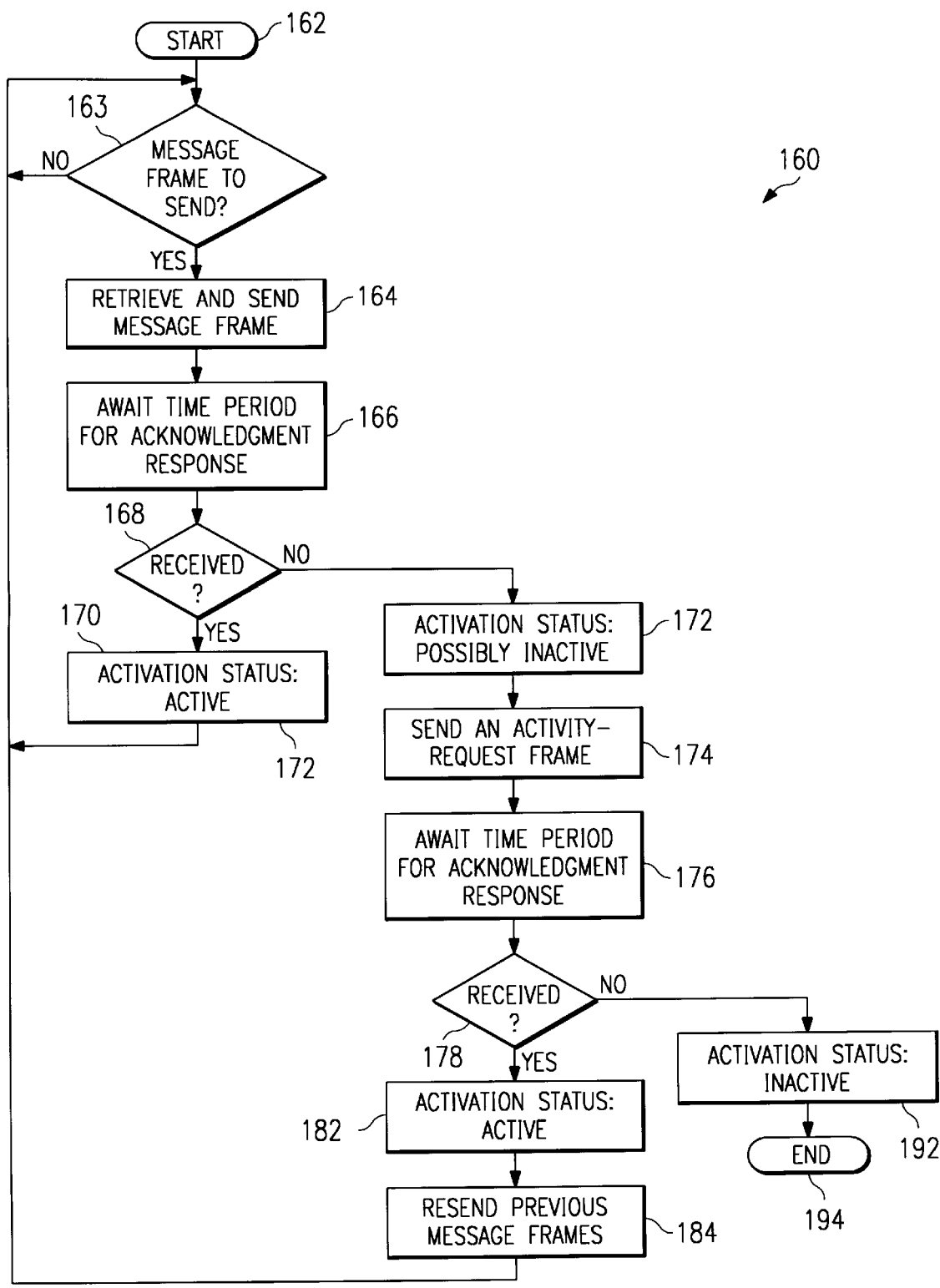
FIG. 3 illustrates a method flow diagram, similar to that shown in FIG. 2, but of another embodiment of the present invention.

FIG. 3 illustrates a method, shown generally at 160, of another embodiment of the present invention. The method 160 is also operable to determine the activation status of a mobile radio modem operable in a communication system to receive packets of data, such as the frames of data communicated during operation of a Mobitex (tm) system. The method 160, in an exemplary embodiment, is operative in a communication system 10, shown in FIG. 1. Again, after entry, indicated by the start block 162 a determination is made at the decision block 163 as to whether a message frame is to be sent. If not, the no branch loops back to the decision block. If a message frame is to be sent, the yes branch is taken to block 164. A message frame is transmitted from the network station to a selected mobile radio modem. When the mobile radio modem receives the signal transmitted thereto, the modem acknowledges the reception by returning to the network station an acknowledgment response signal. The network station awaits for at least a selected time period, as indicated by the block 166, to receive the acknowledgment response signal.

At the decision block 168, a determination is made as to whether or not the acknowledgment response signal has been received at the network station. If so, the yes branch is taken, and the activation status of the radio modem is determined to be active, as indicated by the block 170. Additional message frames are thereafter continued to be transmitted to the radio modem, if necessary, as indicated by a branch back to the block 163. Determinations can further be made responsive to detection of other signals, analogous to that described with respect to decision block 118, shown in FIG. 2.

If, however, the acknowledgment request signal has not been detected at the network station, the no branch is taken from the decision block 168 to block 172. A determination is made there at that the activation status of the radio modem is possibly inactive. Thereafter, an activity-request frame is sent from the network station to the radio modem, as indicated by the block 174. Again, if the radio modem receives the activity-request frame transmitted thereto, the modem acknowledges reception there at by returning an acknowledgment response signal to the network station. The network station awaits for at least a selected time period, indicated by the block 176, for the return of the acknowledgment response signal to the network station.

At the decision block 178, a determination is made as to whether the acknowledgment response signal has been received at the network station. If so, the yes branch is taken, and a determination is made that the activation status of the radio modem is active, as indicated by the block 182. Thereafter, and as indicated by the block 184, previously-transmitted message frames to which there had been no reception of acknowledgment response signals detected at the network station are re-sent, if such frames had been stored in a storage mailbox. Once such previously-transmitted message frames are re-sent, a branch is taken back to the decision block 163.

If, however, a determination is made at the decision block 178 that an acknowledgment response signal has not been returned to the network station to acknowledge reception at the radio modem of the activity-request frame, or if a selected time period has timed-out, the no branch is taken to the block 192. At block 192, the activation status of the radio modem is determined to be inactive. While inactive, the radio modem is considered to be unable to receive message frames and additional message frames are not transmitted thereto for at least a selected time period. A branch is taken to the end block 194.

Because the network station is operable to determine the radio modem to be of an activation status of possibly inactive, temporary breakdowns of communication of message frames to the radio modem do not necessarily cause the radio modem to be considered to be inactive. If, for example, the radio modem is only temporarily out of the range of reception of signals transmitted thereto by the network station, the radio modem is permitted to be determined once again to be of an activation status of active if the radio modem detects the transmission thereto of the activity-request frame. Premature interruption of communication of information to the radio modem is therefore less likely to occur.

Figure 4:
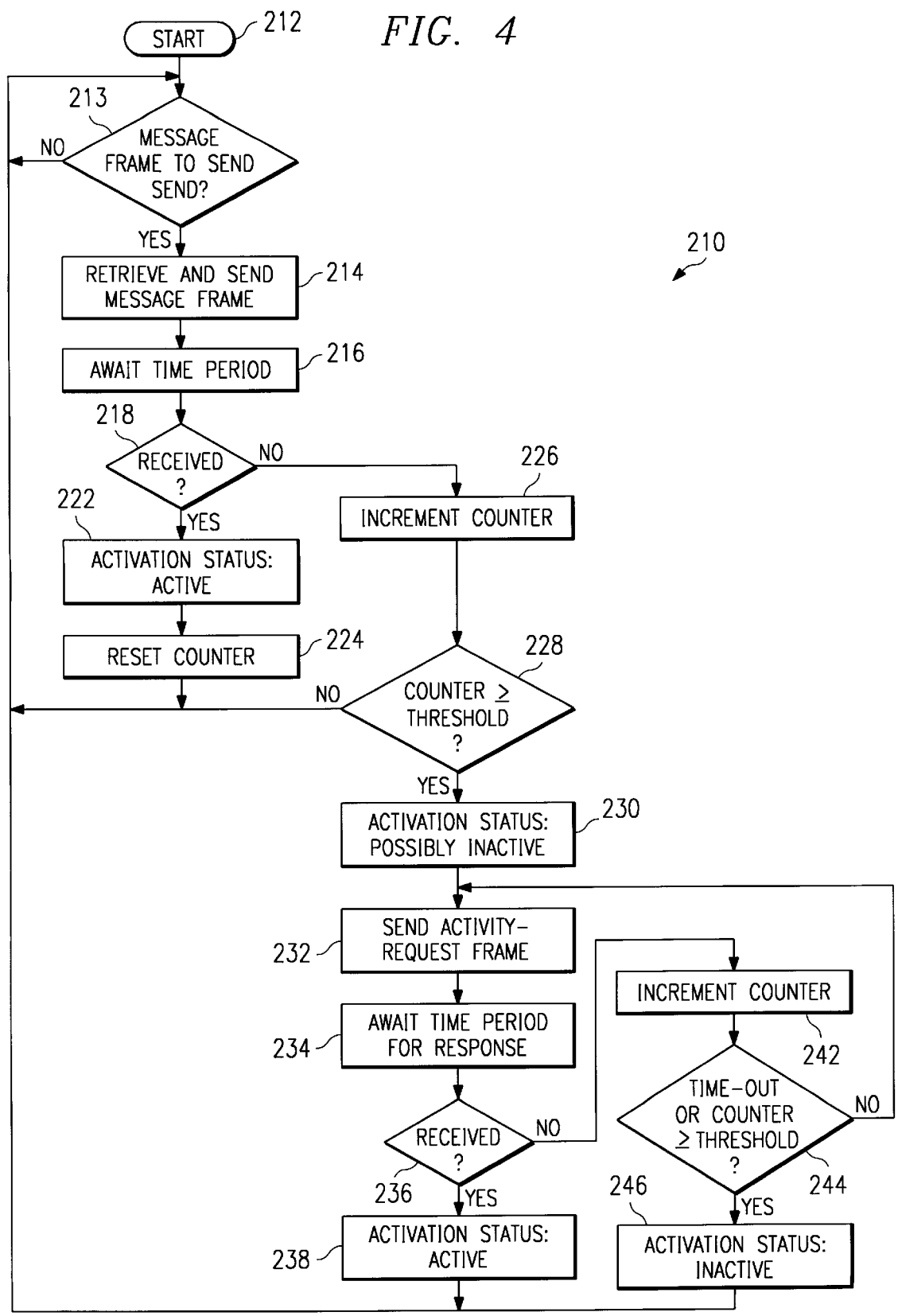
FIG. 4 illustrates a method flow diagram, similar to those shown in FIGS. 2 and 3, but of another embodiment of the present invention.

FIG. 4 illustrates a method, shown generally at 210, of another embodiment of the present invention. The method 210 is also operable to permit a network station to determine the activation status of a receiving station, such as a mobile radio modem 14 of a Mobitex system of which the communication system 10 shown in FIG. 1 is exemplary.

First, after entry into the method, is indicated by the startblock 212, a determination is made at the decision block 213 as to whether a message frame is to be sent. If not, the no branch loops back to the decision block. If a message frame is to be sent, the yes branch is taken to block 214. A message frame is transmitted from the network station to the mobile radio modem. The network station awaits at least a selected time period, as indicated by the block 216 for the return to the network station of an acknowledgment response signal, acknowledging reception at the radio modem of the message frame.

At the decision block 218, a determination is made as to whether or not the acknowledgment response signal has been received at the network station. Again, determinations can further be made responsive to detection of other signals, analogous to that described with respect to decision block 118, shown in FIG. 2. If an acknowledgment response signal has been received, the yes branch is taken to the block 222, and the activation status of the radio modem is determined to be active. The message frame counter is reset, as indicated by the block 224, and a branch is taken back to the block 214 whereat additional message frames can be transmitted, if appropriate.

If, conversely, no acknowledgment response signal is detected at the network station, the no branch is taken to block 226, whereat the message frame counter is incremented. Thereafter, a determination is made, as indicated by the decision block 228 as to whether the message frame counter is greater than a selected threshold. If not, the no branch is taken back to block 213. If, however, the message frame counter is of a count value greater than the selective threshold, the yes branch is taken to block 230 and the activation status of the radio modem is determined to be possibly inactive. Thereafter, and as indicated by the block 232, an activity-request frame is transmitted to the radio modem. The network station awaits at least a selected time period, as indicated by the block 234, for the radio modem to acknowledge reception there at of the activity-request frame. Thereafter, and as indicated by the decision block 236, a determination is made as to whether or not the acknowledgment response signal, or other signal, has been received at the network station. If so, the yes branch is taken, and the activation status of the radio modem is determined to be active, as indicated by the block 238. Additional message frames can thereafter be transmitted to the radio modem by the branch taken back to the block 214.

If an acknowledgment response signal, however, has not been detected, the no branch is taken to the block 242, and an activity-request counter is incremented. Thereafter, and as indicated by the decision block 244, a determination is made as to whether the activity-request counter is greater than a selected threshold or if no responses have been made during a selected time period which has timed-out. If not, the no branch is taken therefrom back to the block 232 and an additional activity-request frame is transmitted. If, however, the activity-request counter is greater than the selected threshold, the yes branch is taken to the block 246, and the activation status of the radio modem is determined to be inactive. Additional message frames are not transmitted to the radio modem for at least a selected time period.

Figure 5:
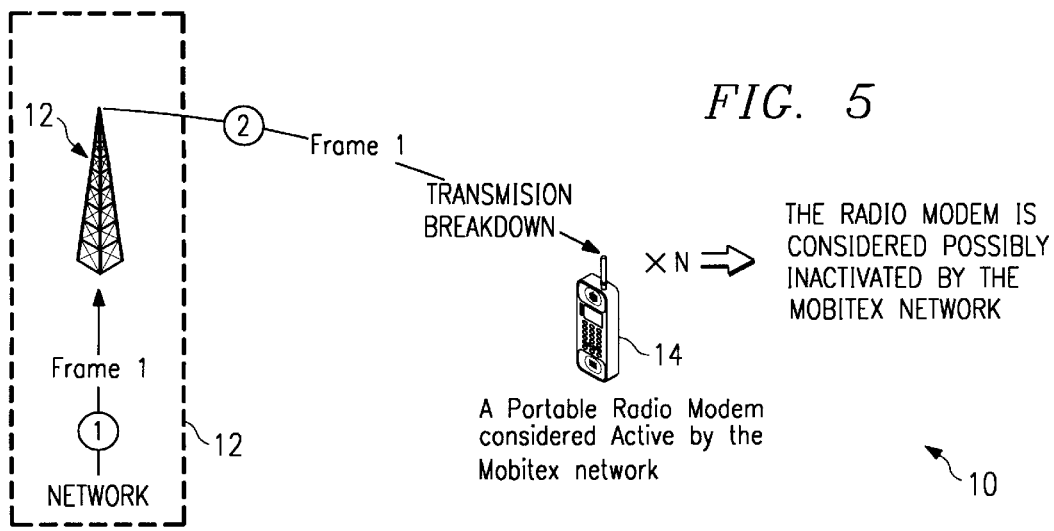
FIG. 5 illustrates diagramatically a Mobitex (tm) system in which the activation status of a mobile radio modem is determined to be possibly inactive during operation of an embodiment of the present invention.

FIG. 5 illustrates again the communication system 10 during operation in which message frames are transmitted upon a downlink between the network station 12 and a mobile radio modem 14. The illustration is representative of operation of an embodiment of the present invention to determine the activation status of the radio modem 14 to be possibly inactive. The manner by which the radio modem is determined to be possibly inactive corresponds to the manner by which the method 210, shown in FIG. 4, determines the activation status of the radio modem to be possibly inactive at block 230 of such method. Here, up to N message frames are transmitted to the radio modem prior to a determination at the activation status of the radio modem is possibly enacted. The number N is the selected threshold of the decision block 228 shown in FIG. 4. Once the radio modem is determined to be possibly inactive, activity-request frames are sent to the radio modem in substitution for message frames. Also, a "No Transfer" message is sent to the sender.

Figure 6:
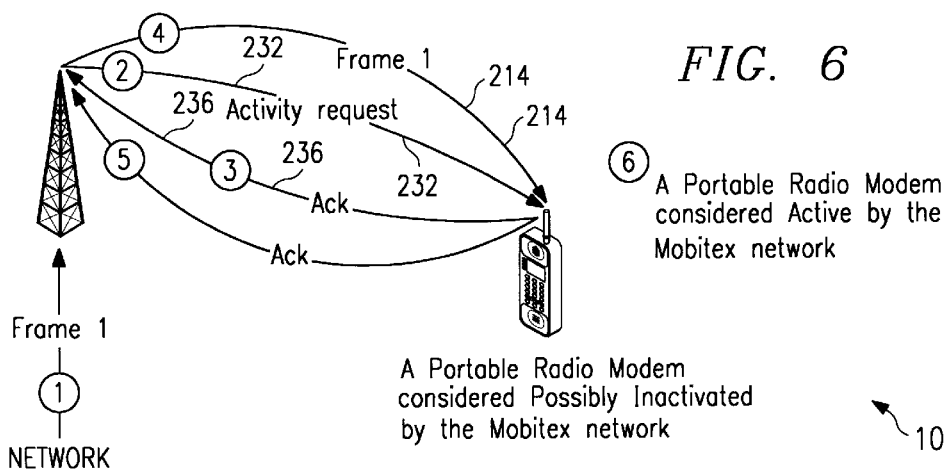
FIG. 6 illustrates diagramatically a Mobitex system, similar to that shown in FIG. 5, but wherein a determination is made that a mobile radio modem is of an activation status of active during operation of an embodiment of the present invention.

FIG. 6 also illustrates again the communication system 10 during operation of an embodiment of the present invention, again to communicate between a network station 12 and a radio modem 14. The figure illustrates operation of a portion of the method 210, shown previously in FIG. 4. Here, subsequent to a determination of the activation status of the radio modem to be possibly inactive, an activity-request frame is transmitted to the modem. Transmission of the activity-request frame to the modem is identified by the reference numeral 232, corresponding to the step shown in the method 210. Here, the radio modem 14 receives the activity-request frame, and acknowledges reception there at with an acknowledgment response signal, here identified by the reference numeral 236.

Responsive to reception at the network station 12 of the acknowledgment response signal, an additional message frame is transmitted from the network station to the radio modem, here indicated at 214. When the radio modem receives such additional message frame, the radio modem acknowledges reception there at with an acknowledgment response signal, here indicated at 218.

Figure 7:
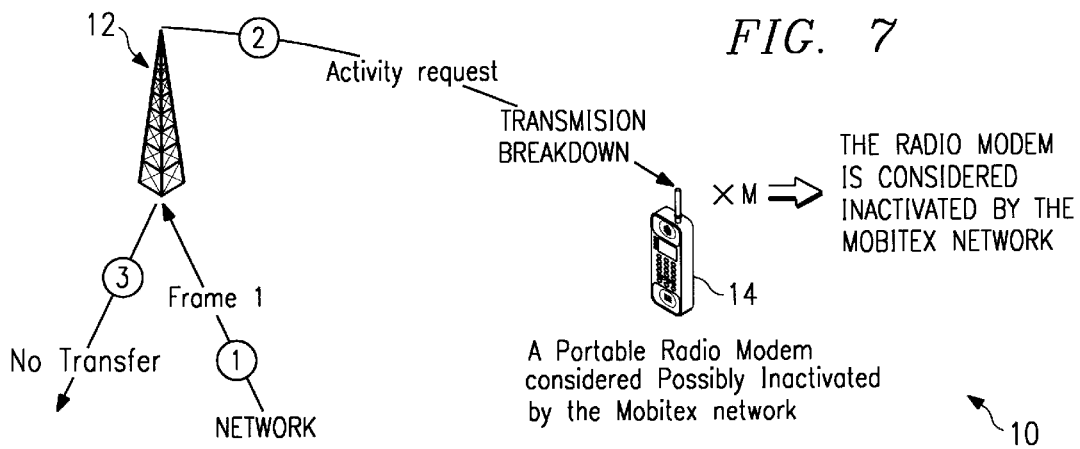
FIG. 7 illustrates diagramatically a radio communication system in which a determination is made that a mobile radio modem is of an activation state of inactive during operation of an embodiment of the present invention.

FIG. 7 also illustrates the communication system 10 during operation of an embodiment of the present invention. The figure illustrates steps carried out subsequent to a determination that the activation status of the radio modem 14 is possibly inactive. Here, M activity-request frames are transmitted by the network station to the radio modem 14 on a downlink a transmission breakdown prevents reception at the radio modem of the activity-request frames. Once the M activity-request frames have been transmitted, and not acknowledged, the activation status of the radio modem is determined to be inactive.

Operation of an embodiment of the present invention permits a more accurate determination of the activation status of a remote communication station, such as a radio modem operable in a Mobitex system. The receiving station is not immediately, and irrevocably, concluded to be inactive if the receiving station fails to acknowledge reception of message data. Instead, the receiving station is first determined to be possibly inactive. A subsequently-transmitted, activity-request is sent to the receiving station. If the receiving station acknowledges reception of the activity-request, a determination is made that the activity status of the receiving station is once again active and additional message data can thereafter be transmitted.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed is:

1. In a packet switching network operable to communicate packets of data to at least one remote communication station, an improvement of apparatus for determining an activation status of the remote communication station, said apparatus comprising:

a transmitter selectively coupled to receive packets of message data and packets of activity-request data, said transmitter for transmitting the packets of message and activity-request data, respectively, when received thereat;

a response detector for detecting acknowledgment response signals generated by the remote communication station, each acknowledgment response signal acknowledging reception at the remote communication station of a packet transmitted thereto by said transmitter; and a controller operable at least responsive to detections made by said response detector, said controller for determining the activation status of the remote communication station to be active when said response detector detects an acknowledgment response signal responsive to transmission of a packet of message data by said transmitter, for determining the activation status of the remote communication station to be possibly inactive when said response detector detects an absence of an acknowledgment response signal responsive to transmission of a selected number of packets of message data, and for determining the activation status of the remote communication station to be inactive when said response detector detects an absence of an acknowledgment response signal responsive to transmission by said transmitter of a selected number of packets of activity-request data.

2. The apparatus of claim 1 wherein the packets of message data to which said transmitter is selectively coupled comprise message frames and wherein the packets of activity-request data to which said transmitter is also selectively coupled comprise activity-request frames.

3. The apparatus of claim 1 wherein said response detector is operable at least for a selected time interval after transmission by said transmitter of each of the packets.

4. The apparatus of claim 1 wherein said controller is further for controlling coupling of said transmitter, selectively to receive the packets of message data and the packets of activity-request data such that said transmitter is coupled to receive at least one packet of activity-request data when the remote communication station is determined to be possibly inactive.

5. The apparatus of claim 1 wherein the selected number of packets of message data responsive to transmission of which said controller determines the remote communication station to be possibly inactive comprises N packets of message data, wherein N is an integer greater than one.

6. The apparatus of claim 5 wherein said controller causes said transmitter to be coupled to receive at least one packet of activity-request data when said response detector detects an absence of acknowledgment response signals acknowledging reception at the remote communication station of the N packets of message data.

7. The apparatus of claim 6 wherein said controller determines the remote communication station to be active when said response detector detects an acknowledgment response signal acknowledging reception by the remote communication station of the at least one packet of activity-request data.

8. The apparatus of claim 7 wherein the at least one packet of activity-request data to which said transmitter is coupled to receive comprises M packets of activity-request data, wherein M is an integer greater than one.

9. The apparatus of claim 8 wherein said transmitter is selectively caused by said controller to be coupled to receive up to the M packets of the activity-request data.

10. In a packet switching network operable to communicate packets of data to at least one remote communication station, an improvement of apparatus for determining an activation status of the remote communication station, said apparatus comprising:

a transmitter selectively coupled to receive packets of message data and packets of activity-request data, said transmitter for transmitting the packets of message and activity-request data, respectively, when received thereat;

a response detector for detecting acknowledgment response signals generated by the remote communication station, each acknowledgment response signal acknowledging reception at the remote communication station of a packet transmitted thereto by said transmitter;

a controller operable at least responsive to detections made by said response detector, said controller for determining the activation status of the remote communication station to be active when said response detector detects an acknowledgment response signal responsive to transmission of a packet of message data by said transmitter, for determining the activation status of the remote communication station to be possibly inactive when said response detector detects an absence of an acknowledgment response signal responsive to transmission of a selected number of packets of message data, and for determining the activation status of the remote communication station to be inactive when said response detector detects an absence of an acknowledgment response signal responsive to transmission by said transmitter of a selected number of packets of activity-request data;

wherein the selected number of packets of message data responsive to transmission of which said controller determines the remote communication station to be possibly inactive comprises N packets of message data, wherein N is an integer greater than one;

wherein said controller causes said transmitter to be coupled to receive at least one packet of activity-request data when said response detector detects an absence of acknowledgment response signals acknowledging reception at the remote communication station of the N packets of message data;

wherein said controller determines the remote communication station to be active when said response detector detects an acknowledgment response signal acknowledging reception by the remote communication station of the at least one packet of activity-request data;

wherein the at least one packet of activity-request data to which said transmitter is coupled to receive comprises M packets of activity-request data, wherein M is an integer greater than one;

wherein said transmitter is selectively caused by said controller to be coupled to receive up to the M packets of the activity-request data; and wherein said transmitter is selectively caused by said controller to be re-coupled to receive packets of message data responsive to detection by said response detector of any of the M packets of the activity-request data.

11. The apparatus of claim 8 wherein M is of a selectable value.

12. The apparatus of claim 5 wherein N is of a selectable value.

13. The apparatus of claim 1 wherein said response detector is further operable to detect at least message-related signals generated at the remote communication station and wherein said controller further permits the transmitter to be coupled to receive the packet of message data when detection is made by said response detector of the at least message-related signals.

14. A method for determining an activation status of a remote communication station at a packet switching network, said method comprising the steps of:

transmitting selected packets of message data from the packet switching network to the remote communication station;

determining whether the remote communication station acknowledges reception of at least one of the selected packets of message data sent thereto during said step of transmitting selected packets;

transmitting at least one packet of activity-request data if the remote communication station is determined, during said step of determining, not to have acknowledged reception of at least one of the selected packets of message data sent thereto;

determining the activation status of the remote communication station to be active if the remote communication station acknowledges reception of the at least one packet of activity-request data and to be inactive if the remote communication station fails to acknowledge reception of the at least one packet of activity-request data.

15. The method of claim 14 wherein said step of transmitting the selected packets of message data comprises transmitting N packets of message data, wherein N is an integer greater than one.

16. The method of claim 14 wherein the remote communication station acknowledges reception of the selected packets of message data by returning an acknowledgment response signal to the packet switching network and wherein said step of determining comprises detecting reception of the acknowledgment response signal at the packet switching network.

17. The method of claim 16 wherein the at least one packet of activity-request data transmitted during said step of transmitting at least one packet of activity-request data is transmitted responsive to lack of detection of the acknowledgment response signal within a selected time period subsequent to transmission of the selected packets of message data during said step of transmitting the selected packets of message data.

18. The method of claim 14 wherein the selected packets of message data transmitted during said step of transmitting the selected packets of message data are formatted into frames of message data.

19. The method of claim 14 wherein the packets of activity-request data transmitted during said step of transmitting the at least one packet of activity-request data are formatted into frames of message data.

20. In a communication system operable to communicate data frames between a first communication station and a second communication station, a combination with the first communication station of apparatus for determining an activation status of the second communication station, said apparatus comprising:

a response detector for detecting an acknowledgment response generated at the second communication station responsive to reception at the second communication station of the data frames transmitted thereto from the first communication station;

an activity-request transmitter for transmitting an activity-request signal to the second communication station, said activity-request transmitter operable when said response detector fails to detect the acknowledgment response within a selected period; and an activation status determiner for determining the activation status of the second communication station, the activation status determined responsive to whether indications of a response to the activity-request signal by the second communication station is returned to the first communication station.

21. A method for selectively communicating data frames from a first communication station to a second communication station, said method comprising the steps of:

detecting at the first communication station an acknowledgment response generated at the second communication station responsive to reception at the second communication station of data frames transmitted thereto from the first communication station;

transmitting an activity-request signal to the second communication station responsive to lack of detection, during said step of detecting the acknowledgment response, of the acknowledgment response;

detecting at the first communication station an activity-request response generated by the second communication station, the activity-request response generated responsive to reception at the second communication station of the activity-request signal;

continuing transmitting data frames to the second communication station if the activity-request response is detected during said step of detecting the activity-request response.

22. A method at a transmitter for assigning an operability status to a remote station, said method comprising the steps of:

transmitting at least one first packet from said transmitter;

assigning a first operability status to said remote station if said transmitter receives a message acknowledge indication in response to said at least one first packet;

assigning a second operability status to said remote station if said transmitter does not receive said message acknowledge indication in response to said at least one first packet;

transmitting at least one second packet from said transmitter if said transmitter does not receive said message acknowledge indication in response to said at least one first packet;

assigning said first operability status to said remote station if said transmitter receives a message acknowledge indication in response to said at least one second packet; and assigning a third operability status to said remote station if said transmitter does not receive said message acknowledge indication in response to said at least one second packet.

23. The method of claim 22 wherein said at least one first packet comprises a message data packet and said at least one second packet comprises an activity-request data packet.

24. The method of claim 22 wherein said first operability status comprises an active status, said second operability status comprises a possibly inactive status, and said third operability status comprises an inactive status.

* * * * *